Feb. 18, 1930.  J. A. GOULD  1,747,826
SOLAR WATER HEATER
Filed Dec. 6, 1928

INVENTOR.
Jay Avery Gould,
BY
Harry F. Riley
ATTORNEY.

Patented Feb. 18, 1930

1,747,826

UNITED STATES PATENT OFFICE

JAY AVERY GOULD, OF ANDOVER, MASSACHUSETTS

SOLAR WATER HEATER

Application filed December 6, 1928. Serial No. 324,303.

The invention relates to a solar water heater.

The object of the present invention is to improve the construction of solar water heaters and to provide a simple, practical and efficient solar water heater of strong, durable and comparatively inexpensive construction not liable to get out of order and which may be arranged for use either in a horizontal, vertical or any other position found most advantageous for exposing it to the sun's rays.

A further object of the invention is to provide a solar water heater of this character adapted to obtain a maximum amount of heat from the sun's rays in a given space and which may be readily drained to prevent freezing.

With these and other objects in view, the invention consists in the construction and novel combination and arrangement of parts hereinafter described, illustrated in the accompanying drawings, and set forth in the claims hereto appended, it being understood that various changes in the form, size and minor details of construction, within the scope of the claims, may be resorted to without departing from the spirit of the invention or sacrificing any of the advantages thereof.

In the drawings:—

Figure 1:
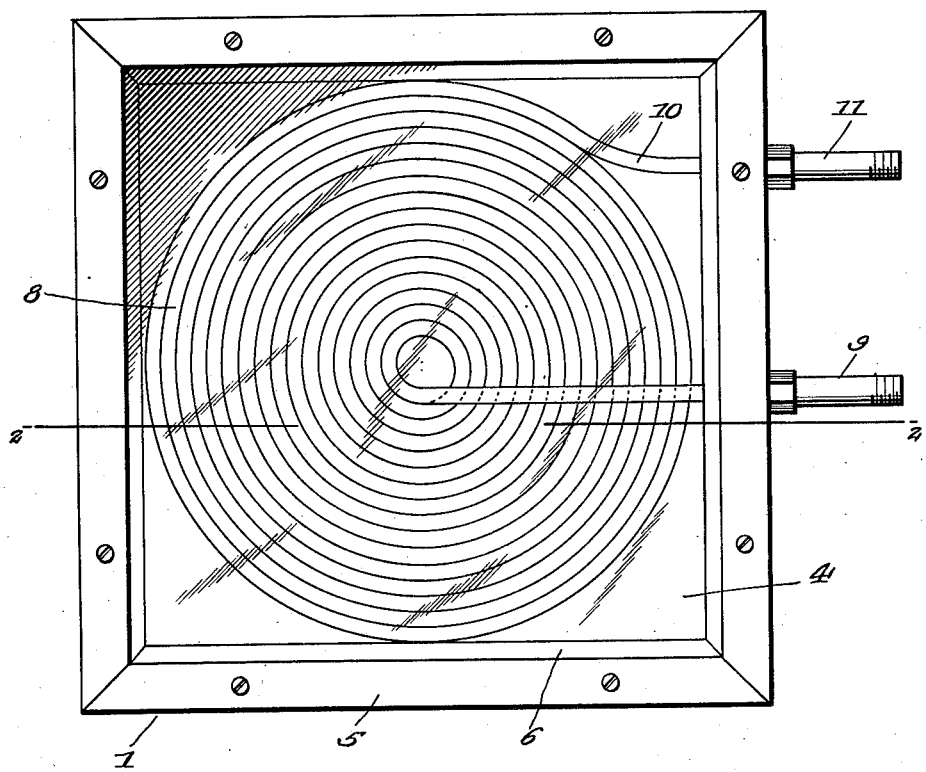
Figure 1 is a plan view of a solar water heater constructed in accordance with this invention.
Figure 2:
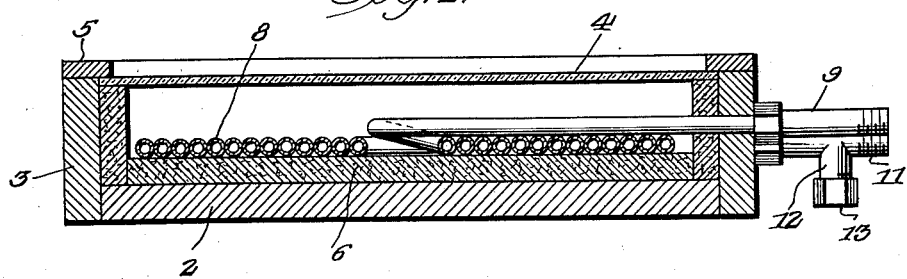
Fig. 2 is a vertical sectional view on the line 2—2 of Fig. 1.

In the accompanying drawing in which is illustrated the preferred embodiment of the invention the solar water heater comprises in its construction a shallow water-tight box 1 constructed of wood or any other suitable material, and composed of a horizontal bottom 2 and vertical walls 3 and provided with a cover 4 of glass or any other suitable material. The glass cover 4 is held in position by a suitable marginal frame 5 which may be constructed of wood or any other suitable material secured to the upper edges of the vertical walls of the shallow box and receiving the marginal edges of the glass cover.

The shallow box is provided with a relatively thick insulating lining 6 of asbestos or any other suitable material which covers the upper face of the bottom and the inner faces of the walls of the shallow box.

Within the shallow box is arranged a flat convolute water heating coil 8 consisting of a copper pipe, but any other suitable material may, of course, be employed in the construction of the heating coil.

The convolutions of the flat heating coil are arranged as nearly as possible in contact throughout and may be secured upon the bottom of the lining and to the bottom of the shallow box by any suitable means and as the convolutions of the flat coil are in substantial contact and touch or nearly touch throughout their length all of the sun's rays striking within the area of the heating coil will be utilized in heating water in the coil and the maximum amount of heat from a given size of heating coil will thereby be obtained. The heating coil is provided with a diametrically disposed outlet branch 9 extending through one of the walls of the shallow box and the adjacent portion of the lining and located above and in contact or nearly in contact with the coils and extending from the central convolution and preferably formed integral therewith as clearly illustrated in Fig. 1 of the drawings. The flat heating coil is also provided with a peripheral branch 10 extending through the said wall of the shallow box and the lining thereof and arranged in the same plane as the heating coil and constituting an inlet for the water.

The peripheral inlet branch 10 of the coil is provided with a suitable fixture 11 having a drain outlet 12 to enable the water to be drained from the heating coil when necessary to prevent any liability of the solar water heater freezing. The fixture may consist of a T-coupling as shown, having one of its arms depending and provided with a removable threaded cap 13, but any other suitable drain may, of course, be provided, as will be readily understood.

In practice the two branches of the heating coil will be connected with a suitable storage tank of the ordinary construction preferably insulated and in accordance with the usual practice will be located on a level with or above the plane of the solar heater for storing the hot water so that an ample supply of the same will be provided during periods when the sun is shining and the solar heater functioning. By this means a sufficient amount of hot water will be provided for use at night and other periods when the sun is not shining. The heat of the sun's rays striking the heating coil will be conducted to the liquid within the coil and the water will circulate through the coil from the inlet branch to the outlet branch. The size and length of the pipe of the heating coil will be in proportion to the amount of water to be heated and the water temperature desired. The solar heater will operate in any position most advantageous for exposing it to the rays of the sun.

The hot water tank may be installed in the usual manner and may have the usual connections for distributing the hot water and supplying the same at the desired points.

In practice suitable valves, not shown, will be provided in both the intake and outlet lines located between the tank and the coil so that the tank can be cut off from the coil when draining the coil.

What is claimed is:

1. A solar heater of the class described, including a shallow box forming a casing, a flat heating coil arranged within the casing upon the bottom thereof with its convolutions in the same plane, said coil being provided with a peripheral inlet branch arranged in the same plane as the convolutions and extending through one of the walls of the casing and provided exteriorily thereof with a depending drain outlet having means for controlling the flow of water therefrom, and a diametrically arranged outlet branch also extending through one of the walls of the casing and located above the convolutions in a different plane from the inlet branch and connected with the heating coil at the center thereof.

2. A solar heater of the class described, including a shallow box forming a casing, an insulating lining within the box and covering the bottom and walls thereof, a flat heating coil arranged within the casing upon the bottom thereof with its convolutions in the same plane and supported by the insulating lining, said heating coil being provided with a peripheral inlet branch extending through one of the walls of the casing and arranged in the same plane as the convolutions of the coil and provided exteriorly of the casing with a normally closed drain outlet, and a diametrically arranged outlet branch extending from the center of the coil over the convolutions thereof through one of the walls of the casing.

In testimony whereof I affix my signature.

J. AVERY GOULD.